United States Patent [19]

Hirata et al.

[11] 4,449,608
[45] May 22, 1984

[54] EXHAUST DEVICE FOR 2-CYCLE ENGINE

[75] Inventors: Makizo Hirata; Yoshiteru Ueda, both of Kakogawa, Japan

[73] Assignee: Kawasaki Jukogyo Kabushiki Kaisha, Kobe, Japan

[21] Appl. No.: 312,217

[22] Filed: Oct. 19, 1981

[30] Foreign Application Priority Data

Oct. 20, 1980 [JP] Japan .......................... 55-149970[U]

[51] Int. Cl.³ .............................................. F01N 7/08
[52] U.S. Cl. ..................................... 181/228; 181/240
[58] Field of Search ................ 181/227, 228, 247–256, 181/232, 265, 270, 240, 269, 273; 138/177, DIG. 11; 60/314, 309–312

[56] References Cited

U.S. PATENT DOCUMENTS

| | | | |
|---|---|---|---|
| 3,687,225 | 8/1972 | Nelson | 181/269 |
| 4,038,820 | 8/1977 | Tsukamoto | 181/273 X |
| 4,192,402 | 3/1980 | Nakagawa et al. | 181/256 |
| 4,225,011 | 9/1980 | Taguchi | 181/269 |

Primary Examiner—Benjamin R. Fuller
Attorney, Agent, or Firm—Jordan and Hamburg

[57] ABSTRACT

An exhaust device for a 2-cycle engine including an exhaust pipe having an expanded portion, and a curved outlet pipe inserted in the exhaust pipe in such a manner that its one end opening is disposed in a position in the expanded portion in which the output power loss of the expanded portion can be decreased and its the other end opening is disposed at one side of the exhaust pipe. The use of a curved pipe as an outlet pipe enables the outlet pipe to be positioned such that its one end opening is disposed in a suitable position in the expanded portion while its the other end opening is disposed at one side of the exhaust pipe, thereby allowing the outlet pipe to have a suitable length and the volume of the resonance chamber in the exhaust pipe to be increased.

8 Claims, 11 Drawing Figures

EXHAUST DEVICE FOR 2-CYCLE ENGINE

BACKGROUND OF THE INVENTION

This invention relates to an exhaust device for a 2-cycle engine.

Heretofore, it has been known in the field of 2-cycle engine production to utilize the gas inertia effect in the exhaust pipe for scavenging the cylinders and drawing fresh gas mixtures thereinto by suction, to increase the output power of engines. More specifically, by causing the combustion gas of high pressure to rapidly expand when flowing through the exhaust pipe immediately after one of the cylinders has started discharge of gas, it is possible to increase pressure differential between the tuner section (exhaust gas expanding section) and the cylinder, to thereby positively draw the combustion gas out of the cylinder by suction.

It is also known to suddenly reduce the cross-sectional area of the passageway at the downstream end of the exhaust pipe (which is normally an inlet portion of a connecting pipe connected to the muffler) to produce positive reflection waves in such a manner that the period for the positive reflection waves to reach the exhaust port of the 2-cycle engine from the exhaust pipe will coincide with the fresh gas-air mixture blow-by period between the closure of the cylinder after scavenging and the closure thereof after exhausting, to thereby avoid the occurrence of the blow-by of the fresh gas-air mixture.

Proposals have hitherto been made to use an exhaust device for a 2-cycle engine shown in FIG. 6, for example, in which a 2-cycle engine is formed with exhaust ports b having an exhaust pipe d connected thereto which has a tuner section (expansion chamber) c of a predetermined length for the purpose of increasing the output power of the engine. The exhaust pipe d has a muffler e connected thereto through a connecting pipe f extending axially of the tuner section c. FIG. 7 shows another exhaust device which has also been proposed, in which a muffler g is mounted in such a manner that it encloses a part of the tuner section of the exhaust pipe d on the downstream side thereof and is located coaxially of the tuner section c.

An exhaust device shown in FIG. 8 has also been proposed, in which the connecting pipe f for the tuner section c of the exhaust pipe d and a muffler, not shown, includes an upstream end portion h which is inserted in the tuner section c, to thereby achieve the effect of reducing noise to a certain degree as compared with a 2-cycle engine having no connecting pipe and to achieve the effect of reducing power loss in the tuner section c. The noise reducing effect achieved by this construction would be accounted for by the fact that the noise produced by the exhaust could be greatly reduced by matching the resonance frequency produced by the length (volume) of an air chamber in the rear portion of the expansion chamber (tuner section c) determined by the length L1 of the upstream end portion h (inserted portion) of the connecting pipe f, with the fundamental and harmonic frequencies of the exhaust gas of a 2-cycle engine.

Some disadvantages are associated with these exhaust devices of the prior art. For example, the arrangement whereby the muffler e, g is located axially of the exhaust pipe d increases the overall length of the exhaust devices.

When the need arises to mount an exhaust device longitudinally as of a motorcycle A shown in FIG. 10, the muffler e of the exhaust device projects rearwardly of the motorcycle. In the case of a snowmobile B shown in FIG. 11 in which it is required to mount an exhaust device in an engine room i of limited space, it is necessary to bend the exhaust pipe d greatly to ensure that the necessary axial length is obtained, so that stable mounting of the exhaust device on the motorcycle is unobtainable.

Another proposal that has hitherto been made involves an exhaust device in which, as shown in FIG. 9, a muffler, not shown, is arranged through a connecting pipe n at one side of a tuner section m of an exhaust pipe k. However, this exhaust device would have the following disadvantages. Since the exhaust gas stream is discharged sideways after it has its pressure converted into static pressure following stagnation in the tuner section m, the output power of the engine would be greatly reduced. The rear portion of the tuner section m could not function sufficiently as a resonance chamber to reduce noise, so that the results achieved by the device in reducing noise would be poor.

SUMMARY OF THE INVENTION

The present invention has been developed for the purpose of obviating the aforesaid disadvantages of the prior art. Accordingly the invention has as its object the provision of an exhaust device for a 2-cycle engine, compact in size, which can be mounted stably on a vehicle body and which is capable of meeting the exhaust noise reduction requirement.

The outstanding characteristics of the invention are that the exhaust device for a 2-cycle engine comprises an exhaust pipe having the cross-sectional area of the exhaust passageway gradually increased from its upstream end at which it is connected to the engine until the downstream end portion thereof has an increased dimension section, and an outlet pipe inserted at one part thereof in the increased dimension section of the exhaust pipe, the outlet pipe opening at the end of the inserted portion thereof toward the upstream side of the exhaust gas stream and located at an end opposite the end of the inserted portion at one side of the increased dimension portion of the exhaust pipe.

The outlet pipe according to the invention is constructed such that it opens at one end thereof in a position which is suitable for obtaining high output power and at the other end thereof at one side of the exhaust pipe by bending the outlet pipe. This structural relationship enables noise in a predetermined frequency range to be reduced and allows increase of the volume of the resonance chamber of the exhaust pipe to thereby increase the effect of reducing noise of a low frequency range.

The exhaust device of the aforesaid construction according to the invention is capable of mounting a muffler at the open end portion of the outlet pipe opening at one side of the exhaust pipe. This is conducive to a reduction in the length of the device in spite of the construction having the exhaust pipe and the muffler connected to each other by a conduit.

DESCRIPTION OF THE PREFERRED EMBODIMENTS

(Embodiment 1)

Figure 1:
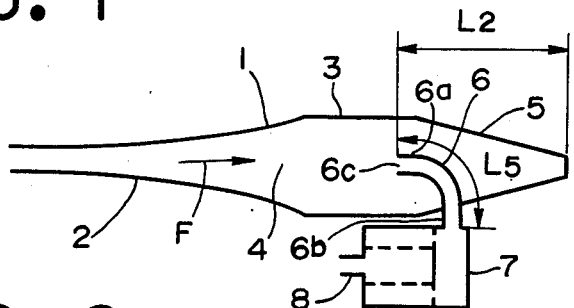
FIGS. 1-5 show embodiments of the exhaust device for a 2-cycle engine comprising preferred embodiments of the invention, FIG. 1 being a schematic view of the exhaust device for a 2-cycle engine comprising a first embodiment, FIG. 2 being a schematic view of a second embodiment, FIG. 3 being a schematic view of a third embodiment, and FIGS. 4 and 5 showing a motorcycle and a snowmobile respectively each having the exhaust device according to the invention incorporated therein.

Referring to FIG. 1, an exhaust pipe 1 connected at its upstream end to an exhaust port of a 2-cycle engine, not shown, comprises a frustoconical first section 2 having the cross-sectional area of an exhaust passageway 4 gradually increased at the upstream end thereof in going toward the downstream end thereof, a cylindrical second section (expanding section) 3 of a diameter equal to the maximum diameter of the frustoconical first section 2, and an inverted frustoconical third section 5 having the cross-sectional area of the exhaust passageway gradually reduced at its upstream end until it is minimized at its downstream end which is closed. The frustoconical first section 2, cylindrical second section 3 and inverted frustoconical third section 5 are contiguously arranged in the indicated order as a unit.

An outlet pipe 6 which is curved has one part thereof inserted in the exhaust pipe 1 by extending through the inverted frustoconical third section 5. The outlet pipe 6 comprises an upstream end portion 6a and a downstream end portion 6b having center axes located perpendicular to each other. The center axis of the upstream end portion 6a of the outlet pipe 6 is coaxial with the axis of the exhaust pipe 1, and the outlet pipe 6 has an upstream end opening 6c at its upstream end portion 6a which faces the direction of flow F of the exhaust gas and is disposed in the interior of the cylindrical second section 3 which is an expanded portion of the exhaust pipe 1. Meanwhile the outlet pipe 6 is connected at its downstream end portion 6b to a muffler 7 located at one side of the exhaust pipe 1.

The muffler 7 has an exhaust port 8 having a center axis substantially parallel to the center axis of the exhaust pipe 1 and opening toward the upstream end of the exhaust pipe 1.

(Embodiment 2)

Figure 2:
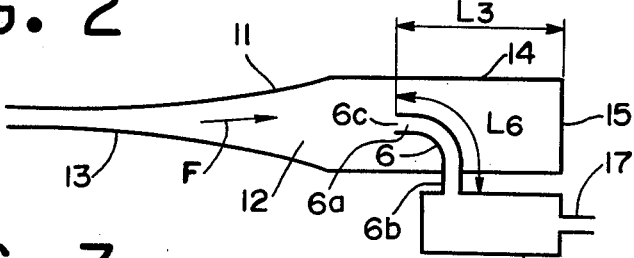

Referring to FIG. 2, an exhaust pipe 11 connected at its upstream end to an exhaust port of a 2-cycle engine, not shown, comprises a frustoconical front section 13 having the cross-sectional area of its exhaust passageway gradually increased in going from the upstream end to the downstream end, and a cylindrical rear section 14 (expanded portion) of a diameter equal to the maximum diameter of the frustoconical front section 13 contiguously arranged in the indicated order as a unit. The cylindrical rear section 14 has a relatively large length (which substantially corresponds to the sum of the length of the cylindrical second section 3 and the inverted frustoconical third section 5) and has its downstream end closed by an end plate 15.

The outlet pipe 6 which is of the same construction as the outlet pipe 6 of the first embodiment has its upstream end opening 6c disposed forwardly of the intermediate position in the cylindrical rear section 14 and its rear end portion 6b communicating with a muffler 16 located parallel to the cylindrical rear section 14. 17 is an exhaust port of the muffler 16 coaxial with the exhaust pipe 11 which opens toward the rear.

(Embodiment 3)

Figure 3:
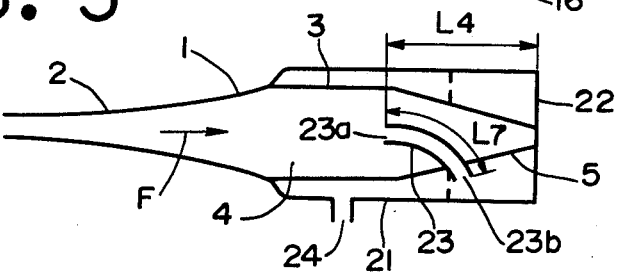

In this embodiment, as shown in FIG. 3, a muffler 21 enclosing the cylindrical second section 3 and the inverted frustoconical third section 5 of the same construction as those of the first embodiment are disposed coaxially of the exhaust pipe 1 on the outside thereof. The exhaust pipe 1 has its downstream end (of its cylindrical second section 5) positioned against the inner surface of a downstream end plate 22 of the muffler 21.

An outlet pipe 23 of a curved shape has an upstream end opening 23a disposed forwardly of the frustoconical third section 5 of the exhaust pipe 1 and a downstream end portion 23b penetrating the wall of the cylindrical second section 5 to be inserted in the muffler 21.

The muffler 21 has an exhaust port 24 formed at one side of the muffler 21 in a position forwardly of the position in which the downstream end portion 23b of the outlet pipe 23 is located and having an axis perpendicular to the center axis of the exhaust pipe 1.

Figure 4:
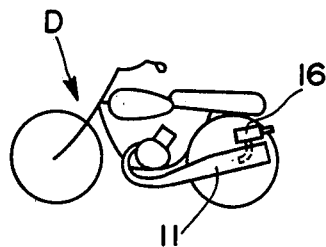
Figure 5:
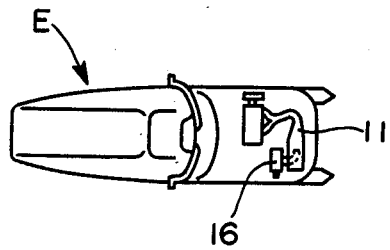
Figure 6:
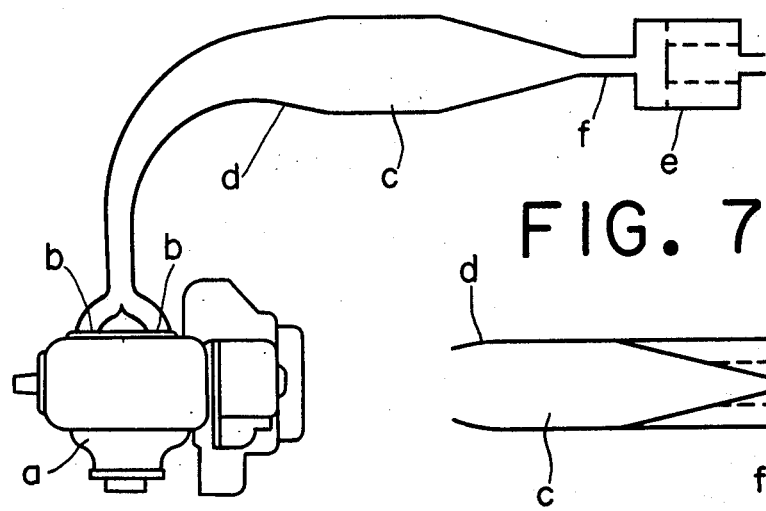
FIGS. 6–11 show exhaust devices for 2-cycle engines of the prior art, FIG. 6–9 being schematic views of exhaust devices for 2-cycle engines of the prior art, and FIGS. 10 and 11 showing a motorcycle and a snowmobile respectively each having the exhaust device shown in FIG. 6 incorporated therein.
Figure 7:
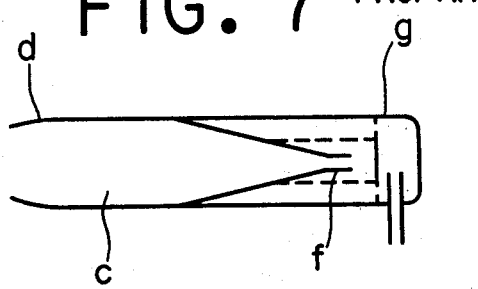
Figure 8:
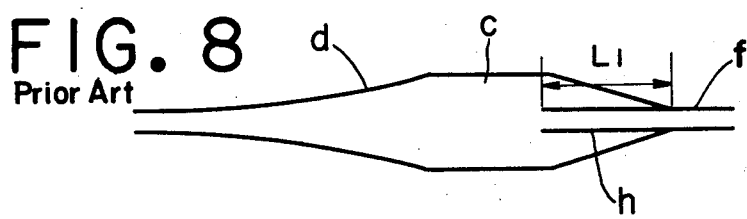
Figure 9:
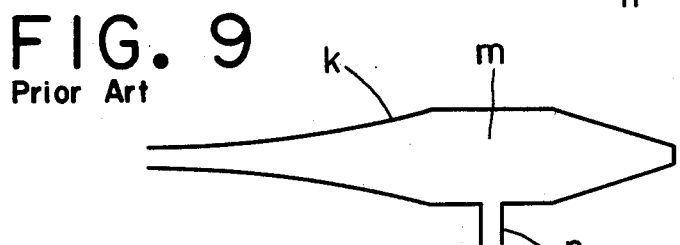
Figure 10:
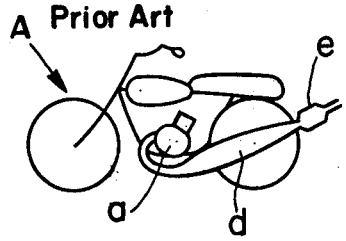
Figure 11:
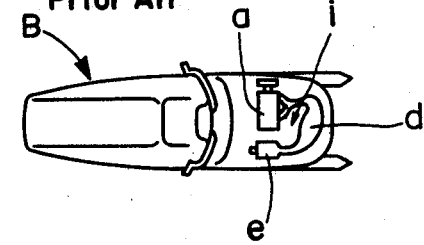

In all the embodiments shown and described hereinabove, the outlet pipe performs the function of releasing the exhaust gas sideways of the exhaust pipe, and the muffler is disposed on one side of the exhaust pipe or around the outer periphery thereof. This enables the overall length of the exhaust device to be reduced to thereby obtain a compact overall size and improve the stability with which the exhaust device is mounted. Thus when the exhaust device according to the invention is incorporated in a motorcycle D as shown in FIG. 4, the muffler 16 does not extend rearwardly of the motorcycle as is the case with the prior art. When it is incorporated in a snowmobile E as shown in FIG. 5, the need to greatly bend the exhaust pipe 11 experienced in the prior art can be eliminated.

The result of this is that expenses for dies, jigs and other parts can be greatly reduced, thereby enabling cost to be greatly reduced.

According to the invention, a portion of the outlet pipe is inserted in the expanded portion of the exhaust pipe in such a manner that the distance from its open end within the exhaust pipe and the rear end of exhaust pipe has a predetermined value (which is designated by L2, L3 and L4 in the different embodiments), so that the resonance frequency obtained in the rear portion of the expansion chamber in the expanded portion of the exhaust pipe as a result of the insertion of the portion of the outlet pipe in the exhaust pipe as aforesaid matches the fundamental and harmonic frequencies of the engine. This is conducive to reduced noise on a large scale. The result achieved in reducing noise as described hereinabove is greatly enhanced by the structural relationship that the upstream end of the outlet pipe is disposed in a suitable position substantially in the center of the expansion chamber (expanded portion) and faces the direction of flow F of the exhaust gas. The resonance and dynamic pressure of the flow of the exhaust gas are led from the exhaust pipe outwardly thereof, so that the output power of the engine increases because a great reduction in output power experienced in the prior art can be eliminated.

In the invention, the position in which the outlet pipe is mounted can be selected as desired over a wide range and the length of the outlet pipe (which is designated by L5, L6 and L7 in the different embodiments) can be selected as desired, so that the effect achieved in reducing noise by the insertion of a portion of the outlet pipe in the exhaust pipe as described hereinabove can be enhanced.

From the foregoing description, it will be appreciated that the exhaust device according to the invention is compact in size, can be mounted on a motorcycle or snowmobile with high stability, and can achieve excellent effect in reducing noise.

What is claimed is:

1. An exhaust device for a 2-cycle engine comprising:
    an exhaust pipe connected at its upstream end to an exhaust port of the engine and having its cross-sectional area increased gradually from the upstream end in going toward the downstream end so that the exhaust pipe has an expanded section in its downstream portion; and
    an outlet pipe having one part thereof inserted in the expanded portion of the exhaust pipe and opening at its upstream end in a position in which the open end faces the direction of flow of the exhaust gas and at its downstream end at one side of the exhaust pipe, whereby the exhaust gas flowing through the exhaust pipe can be led out of the exhaust pipe through the outlet pipe.

2. An exhaust device for a 2-cycle engine as claimed in claim 1, further comprising a muffler disposed on one side of the exhaust pipe, the outlet pipe opening at its downstream end in the muffler.

3. The device of claim 1 in which said exhaust pipe comprises
    (A) a frustoconically-shaped section gradually increasing in cross-section from the upstream end thereof to the downstream end thereof,
    (B) said expanded section in the downstream end thereof cylindrically-shaped with a diameter substantially equal to the maximum diameter of said expanded, frustoconically-shaped section (A), and
    (C) an inverted frustoconically-shaped section gradually decreasing in cross-section from the upstream end thereof to the downstream end thereof, and being closed at the downstream end thereof, said frustoconically-shaped section (A), said expanded section (B), and said inverted frustoconically-shaped section (C) all contiguously arranged in this order as a single unit, and
    said outlet pipe is curved, having an upstream center axis and a downstream center axis substantially perpendicular to one another, said upstream center axis substantially coaxial with a center axis of said exhaust pipe.

4. The device of claim 3 additionally comprising a muffler, said muffler positioned to one side of said exhaust pipe, with the downstream end of said outlet pipe opening into said muffler, and said muffler comprising an exhaust port having a center axis substantially parallel to the center axis of said exhaust pipe and opening in the direction of the upstream end of said exhaust pipe.

5. The device of claim 1 in which said exhaust pipe comprises
    (A) a frustoconically-shaped section gradually increasing in cross-section from the upstream end thereof to the downstream end thereof,
    (B) said expanded section in the downstream end thereof cylindrically-shaped with a diameter substantially equal to the maximum diameter of said expanded frustoconically-shaped section (A) and being closed at the downstream end thereof, said frustoconically-shaped section (A) and said expanded section (B) contiguously formed as a single unit,
    said outlet pipe is curved, having an upstream center axis and a downstream center axis substantially perpendicular to one another, said upstream center axis substantially coaxial with a center axis of said exhaust pipe, and
    said open upstream end of said outlet pipe is disposed forwardly of an intermediate position in the expanded section (B) of said exhaust pipe.

6. The device of claim 5 additionally comprising a muffler, with the downstream end of said outlet pipe communicating with said muffler, said muffler being substantially parallel to said expanded section (B) of said exhaust pipe and having an exhaust port with a center axis substantially parallel to the center axis of said exhaust pipe and opening in the direction of the downstream end of said exhaust pipe.

7. An exhaust device for a two-cycle engine, comprising
    an exhaust pipe connected at its upstream end to an exhaust port of the engine, in which said exhaust pipe comprises
    (A) a frustoconically-shaped section gradually increasing in cross-section from the upstream end thereof to the downstream end thereof,
    (B) an expanded section in the downstream end thereof, cylindrically-shaped with a diameter substantially equal to the maximum diameter of said frustoconically-shaped section (A), and
    (C) an inverted, frustoconically-shaped section gradually decreasing in cross-section from the upstream end thereof to the downstream end thereof, and being closed at the downstream end thereof, said frustoconically-shaped section (A), said expanded section (B), and said inverted frustoconically-shaped section (C) all contiguously arranged in this order as a single unit, and
    an outlet pipe having one part thereof inserted in the expanded portion of the exhaust pipe and opening at its upstream end in a position in which the open end faces the direction of flow of the exhaust gas and at its downstream end at one side of the exhaust pipe, said outlet pipe curved with its upstream end disposed forwardly of said inverted, frustoconically-shaped section (C) of said exhaust pipe and its downstream end penetrating a wall of said inverted, frustoconically-shaped section (C) of said exhaust pipe, whereby the exhaust gas flowing through the exhaust pipe can be led out of the exhaust pipe through the outlet pipe.

8. The device of claim 7 additionally comprising a muffler, said muffler substantially enclosing said expanded portion (B) and said inverted, frustoconically-shaped portion (C) of said exhaust pipe, with the closed downstream end of said inverted, frustoconically-shaped section (C) of said exhaust pipe abutting an inner surface of a side of said muffler, and said downstream end of said outlet pipe opening into said muffler, said muffler comprising an exhaust port formed in a side of said muffler forwardly of said downstream end of said outlet pipe and having a center axis substantially perpendicular to the center axis of said exhaust pipe.

* * * * *